April 29, 1969 W. J. WUENSCH 3,441,665

TRANSMISSION SYSTEM UTILIZING A SINGLE CABLE FOR ACCOMPLISHING FORWARD TRANSMISSION AND REVERSE SUPERVISORY CONTROL SIGNALLING

Filed Nov. 10, 1965

INVENTOR.
WALTER J. WUENSCH

BY Anthony D. Cennamo

ATTORNEY

United States Patent Office 3,441,665
Patented Apr. 29, 1969

3,441,665

TRANSMISSION SYSTEM UTILIZING A SINGLE CABLE FOR ACCOMPLISHING FORWARD TRANSMISSION AND REVERSE SUPERVISORY CONTROL SIGNALLING

Walter J. Wuensch, Ontario, N.Y., assignor to Xerox Corporation, Rochester, N.Y., a corporation of New York Filed Nov. 10, 1965, Ser. No. 507,176
Int. Cl. H04n 7/10
U.S. Cl. 178—6 5 Claims

ABSTRACT OF THE DISCLOSURE

In a graphic communication system, apparatus for accomplishing forward transmission and reverse supervisory control signalling and including a single cable which serves to carry both forward video and control signals and reverse supervisory signals, and a control switching means at the receiving end which selectively couples a receiver cable terminator to one of two appropriate sources of bias in response to a detected condition, and establishes a predetermined quiescent D.C. voltage level on the transmission cable. Means are provided at the transmitter to recognize the D.C. level as a reverse supervisory control signal indicating synchronism between the transmitter and receiver.

This invention relates to information transmission systems and more particularly to synchronizing signalling and control apparatus for facsimile systems and the like.

In many communication systems, transmitted information signals are useful only if they are related to some time value or scale which is common to both the transmitter and receiver. A common example is television wherein the received video signals are completely unintelligible unless the receiver scanning means is locked in, i.e., in phase and frequency, synchronism with the transmitter scanner. Similar problems exist in multiplexed telemetry systems, facsimile systems, and similar graphic communications systems. In such systems, information is transmitted in a repetitive series of uniform short intervals. Most of each time interval is utilized in the transmission of pictures or other information data but a portion of each interval is commonly utilized for the transmission of a synchronizing signal of a predetermined form.

While the invention is equally applicable to all graphic and general information communication systems, it will be described in conjunction with a facsimile system. It is conventional in a facsimile system to employ a transmitter which scans an original document in some predetermined raster or pattern of sequential lines and derives video signals which correspond to the optical density of the original document being scanned. These video signals are transmitted to a remote receiver which includes a marking means which scans a record medium in synchronism with the transmitter scanner and in response to the video signals marks the record medium, thus recreating the original document. In this type of facsimile system, the resolution and fidelity of the image produced at the receiver depends on the characteristic of the transmitter and receiver as well as the phase, frequency distortion, and noise characteristics of the communication link which connects the transmitter and receiver.

As is known in the art, it is customary to initially transmit a series or pattern of synchronizing signals prior to the transmission of the video signals thereby insuring that the receiver is synchronized with the transmitter. Further, it is known in the art for the receiver to generate and transmit an appropriate signal to the transmitter indicating that the receiver is in synchronism with the transmitter. While it is desirable for the transmitter to know that the receiver is ready, i.e., in synchronism, in order to avoid lost or wasted transmission time when the transmitted video signals would be unintelligible due to the loss of synchronism, it is often a costly luxury which the normal low and medium cost systems cannot afford.

The transmission link is usually, by far, the most expensive element in a graphic communication system and the one which principally limits the speed and/or quality of transmission. As is known, prior art attempts to obtain synchronism supervisory control involves the use of a separate supervisory channel or a transmission link of sufficient bandwidth capacity to permit a seperate supervisory channel. Because the transmission link is a very expensive element in the facsimile system, neither of the above mentioned methods of obtaining reverse supervisory control have been satisfactory. Even where a narrow band supervisory channel is employed, it still represents a potentially costly item in any facsimile or graphic communication system.

It is, therefore, an object of the present invention to provide pseudo-duplex transmission capabilities on a direct-cable simplex transmission link.

It is another object of this invention to simplify monitoring and maintaining synchronism between transmitters and receivers in the graphic communication systems.

It is another object of the present invention to provide a method and apparatus for accomplishing forward transmission and reverse supervisory control signalling facilities over a simple direct cable transmission link.

It is yet another object of the present invention to reduce the operating costs of graphic communication systems.

It is a still further object of the present invention to eliminate the need for separate supervisory channels in direct, cable-linked graphic communication systems.

In accomplishing the above listed and other desirable objects, applicant has invented a new method and novel signalling apparatus for effecting reverse supervisory control in a simplex communication system wherein the transmitter and receiver are interconnected by a direct cable run. The transmitter line driver is DC coupled through the cable to the receiver line terminator in the conventional manner. Forward supervisory and information signals are represented as transitions between predetermined DC levels in response to the selective actuation of the transmitter line driver between predetermined conductive states during predetermined intervals. Reverse supervisory control switching means selectively couples the receiver cable terminator to one of two appropriate sources of bias. The switching means is responsive to a detected condition, for example, a synchronized condition between the transmitter and receiver, establishes a predetermined quiescent DC voltage level on the transmission cable. Voltage level or threshold responsive detector means is provided at the transmitter to recognize the predetermined quiescent DC level as a reverse supervisory control signal indicating synchronism between the transmitter and receiver. Thus, a single cable serves to carry both forward video and control signals and reverse supervisory signals.

For a more complete understanding of applicant's invention, reference may be had to the following detailed description in conjunction with the drawings wherein.

Figure 1:
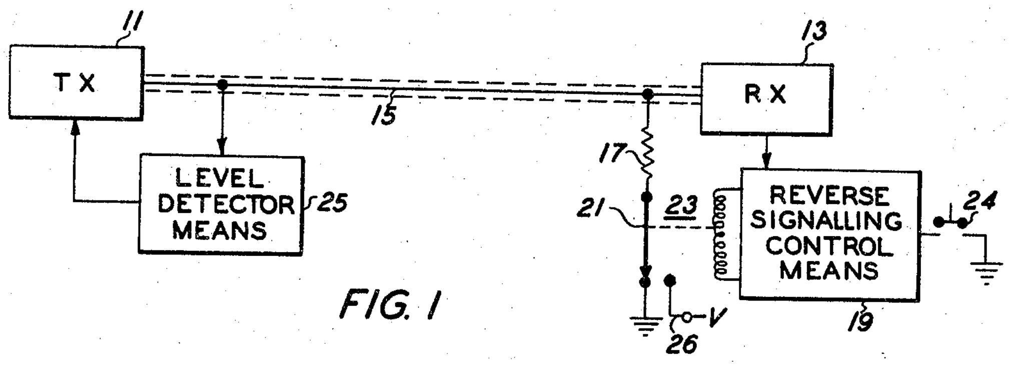
FIG. 1 is a block diagram of a communication link in accordance with the principles of applicant's invention.

Referring now to FIG. 1, there is shown a simplex transmission system incorporating the reverse supervisory control features in accordance with the present invention. As shown the transmission system comprises the transmitter 11, a receiver 13, and an interconnecting cable 15. The respective transmitter and receiver apparatus 11 and 13 may comprise any compatible system known in the art. For example, they may comprise a frequency shift-keyed transmitter which applies a series of predetermined frequencies to the transmission link interconnecting the transmitter and receiver in response to information signals applied to the iput of the transmitter. In such an example the receiver would comprise a demodulator which in response to received signals would generate or reconstitute the information signals applied to the transmitter. Alternatively, the respective transmitter and receiver may comprise digital circuitry for applying two-level information signals to the cable 15 in response to coded information signals applied to the transmitter and reconstituting the binary or data signals at the receiver. The output of the receiver may be utilized in any of the well known data communication systems, for example, as hereinafter is to be more fully explained, for driving a facsimile printer. The information to be relayed from the transmitter to the receiver in the simplex system as well as forward supervisory control signals are coupled to the input of cable 15 at the transmitter 11 and received at the input terminal of receiver 13 in the normal manner. The communication link may comprise as shown a coaxial cable or any other type link for interconnecting the transmitter and receiver. As shown the coaxial cable 15 is terminated in its characteristic impedance 17 at the receiver end. This portion of the communication network is standard and is described only to illustrate the present invention in the preferred operative environment.

Reverse supervisory signalling control means 19 is arranged to be responsive to a predetermined condition at the receiver, for example, the receiver being in synchronism with the transmitter. In response to the detection of such a predetermined condition, reverse supervisory signalling control means 19 selectively positions contact arm 21 of switch 23 from the normal position, as shown, to the actuated position 26. In the normal position one end of the line termination impedance 17 is coupled to source of reference potential, for example, ground. In the actuated position the same end of the line termination impedance 17 is coupled to a source of reverse signal potential, for example, minus V volts. Thus, the actuation of switch 23 in response to the detection of a predetermined condition results in the alteration or change of the quiescent or bias voltage level of the cable 15. Similarly, a manual reverse signalling mode may be incorporated in the transmission system. For example, switch 24 may be arranged to selectively actuate reverse signalling control means 19 in response to the operation of the switch by an operator.

Level detector means 25 is coupled to the cable at the transmitter end and is adapted to monitor the voltage level of the cable. The level detector means 25 may comprise a lower limit detector such as a threshold detector circuit designed to detect the reverse signal quiescent voltage level coupled to the cable through the receiver terminator impedance 17 in response to the selective actuation of arm 21 of switch 23 to the actuated position. The output of the level detector means 25 is coupled to an appropriate circuit in the transmitter to signal the detection of the predetermined quiescent voltage level which has arbitrarily been denominated as indicative of a reverse supervisory signal.

In operation the forward information and supervisory signals, for example, video and control signals, are applied to the cable 15 at the transmitter end and received and utilized at the receiver end in the normal manner. In response to detected condition at the receiver, for example, an in phase condition between the transmitter and receiver the reverse supervisory signalling control means 19 selectively positions the moving arm 21 of switch 23 from its normal position to an actuated position. This results in the application of a bias voltage level to the cable which is detected at the transmitter by the level detector means. The output of the level detector means in turn triggers an appropriate control circuit in the transmitter 11 to signal the existence of the predetermined condition at the receiver.

Figure 2:
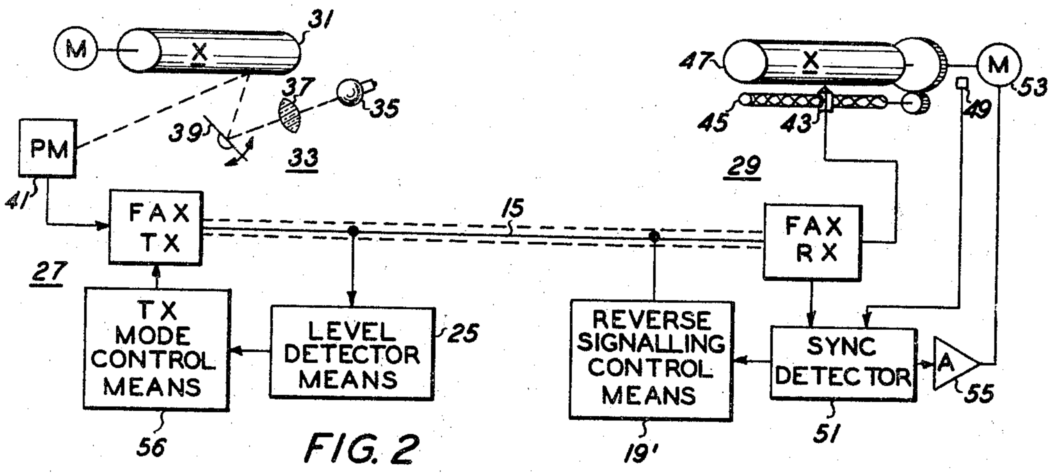
FIG. 2 is a block diagram of a graphic communication system embodying the principles of applicant's invention.

Referring now to FIG. 2 there is shown a simplex facsimile system including the reverse supervisory signalling apparatus in accordane with the present invention. As is known, a facsimile system comprises a transmitter station 27 and a remote receiver station 29. At the transmitting station an original document to be transmitted is positioned on a document station, for example, a rotatably supported cylinder 31 and a tiny beam of light is caused to oscillate across successive portions of the document thereby tracing a raster pattern. As shown the image exploring device 33 may comprise a lamp 35, a lens 37 and a rotatably supported mirror 39. Relative translatory motion between the image scanning device and the document causes successive portions of the document to be presented to the beam of light of the image exploring device. Light reflected from a portion of the document explored by the light beam of the image exploring device is focused onto a photoelectric detector 41. Photoelectric detector 41 converts the varying intensity light rays reflected from the document into corresponding varying amplitude electric currents. As is known light rays reflected from a lighter or unmarked portion of the document are more intense and therefore the corresponding currents from the photoelectric detector are of a higher amplitude. When the scanning light rays strike a dark or marked portion of a document, a majority of the exploring rays are absorbed and less light is reflected whereupon the corresponding currents from the photoelectric detector are of a lower amplitude. In this manner the light and dark information portions of the document are converted into corresponding electrical currents.

The output of the photoelectric detector 41 is coupled to a suitable facsimile transmitter wherein suitable signals for transmission over cable 15 are generated. The facsimile transmitter may comprise, for example, a suitable squaring amplifier wherein the signals eminating from the detector 41 are squared and the resulting bi-level or binary signals are used to control a frequency shift key modulator or DC line driver in the case of a two-level system. For continuous tone facsimile other modulation schemes well known in the art may be employed.

The facsimile signals transmitted over the cable or any other communication link are applied to the input terminal of facsimile receiver 29. The complexity and function of the electronic circuitry of the facsimile receiver will depend on the modulation scheme employed in the facsimile transmitter. Generally speaking, the received signals will comprise composite or multiplexed video and control signals. The respective control and video signals after demodulation are used to control the operation, i.e., synchronization of the facsimile printer and the actuation of the facsimile marking apparatus respectively. The receiver printer may comprise any marking apparatus known in the art, for example, selectively positional stylus 43 supported on a lead screw 45 and driven by gears 46 coupled to marking drum 47.

As is known in the art in order to faithfully reproduce a facsimile of the transmitted document, the facsimile printer must be operated in synchronism with the scanning apparatus of the receiver. In the normal facsimile system, synchronizing signals are transmitted from the transmitter to the receiver and such synchronizing signals are used to establish synchronism between the scanning and marking apparatus respectively. As hereinabove stated, it is common to use a reverse supervisory channel to signal such synchronized condition between the transmitter and receiver in order to avoid transmission of video signals when the receiver is out of synchronism with the transmitter. In accordance with the present invention reverse supervisory signals are sent over the simplex communication link interconnecting transmitter and receiver.

In normal operation an initial synchronizing signal or pattern is transmitted at the beginning of each transmission cycle and periodically throughout the transmission time, for example, during a time interval between successive lines. In response to the reception of a synchronizing burst, the facsimile receiver attempts to slave the facsimile printer to the received signal. For example, signals generated at the receiver by pick up 49 are applied to a sync detector 51 which in turn modifies the drive to motor 53 to bring the rotation of drum 47 in synchronism with the received signals. As is known the electrical power may be interrupted in the case of a synchronous motor or alternatively the frequency of the electric drive signals applied to the motor, for example, by amplifier 55 may be altered to bring the rotation of the drum into synchronism with the received signals. Sync detector 51 in response to the detection of a synchronous condition at the receiver actuates the reverse supervisory signalling control means 19'. As hereinabove stated the reverse supervisory control means may comprise switching means for selectively coupling an appropriate source of voltage to the cable 15. In addition to the selectively operable mechanical or electro-mechanical switching means discussed hereinabove in conjunction with FIG. 1, the control means may comprise any suitable logical switching circuitry, for example, a transistor gate. Level detector means 25, as hereinabove described in conjunction with FIG. 1, is arranged to detect the predetermined reverse signal voltage on the cable thereby detecting the reverse supervisory control signal.

Figure 3:
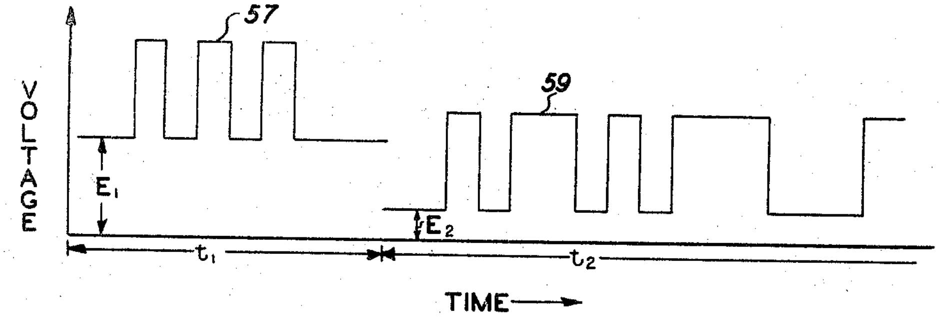
FIG. 3 is a group of idealized voltage-time wave forms illustrating the operation of applicant's invention.

Referring now to FIG. 3 there is shown a group of idealized voltage-time waveforms which characterize the operation of one embodiment of applicant's invention. The first group of pulses 57 may correspond to a synchronizing burst as shown during the interval $t_1$. This group of pulses may correspond, for example, to a synchronizing burst which would be transmitted when the facsimile system illustrated in FIG. 2 is initially turned on. This group of synchronizing pulses has a quiescent level $E_1$ which could correspond to, for example, a non-synchronized condition between the transmitter and receiver. As hereinabove stated in response to such a synchronizing burst, the facsimile printer would be slaved to the transmitted synchronizing pulses thereby establishing a synchronized condition between the scanning means at the transmitter station and the marking apparatus at the receiver. In response to the synchronizing of the respective transmitter and receiver scanning apparatus the sync detector 51 would actuate the reverse supervisory signalling control means 19' in the manner hereinbefore set forth. In response to the actuation of the reverse supervisory signalling control means 19' a second quiescent level $E_2$, shown during the period $t_2$ would be established on the cable 15. This quiescent level would be detected by the level detected means 25 thereby signalling the establishment of the predetermined, i.e., synchronized, condition. In response to the detection of the synchronized condition level detector means 25 would trigger appropriate transmitter mode control circuitry 56 at the facsimile transmitter to enable transmission of video signals, for example, the waveform train 59 shown during the interval $t_2$.

In the foregoing description there is disclosed a new method and novel apparatus for selectively accomplishing reverse supervisory control signalling over a simplex transmission system. The pseudo-duplex mode of transmission over a simplex transmission link is accomplished by selectively altering the quiescent voltage level on the interconnecting cable at the receiver, in the case of a direct cable communication link, and detecting such level shift at the transmitter. The various embodiments disclosed are to be understood as illustrative only and as will be evident to those skilled in the art many modifications may be made without departing from the scope of applicant's invention. For example, while applicant's invention has been described in conjunction with a direct cable-linked communications network it would be equally applicable to a system in which the receiver periodically transmitted a predetermined signal to the receiver which was detected in the hereinabove described manner and used to actuate the level detector means. Similarly many modifications may be made in the switching and detecting apparatus employed to implement applicant's invention. It is therefore applicant's intention to be limited only as indicated by the scope of the following claims.

What is claimed is:

1. A communication transmission system comprising direct current path communication link means for interconnecting a transmitter station and a remote receiver station, impedance means for terminating said communication link means at said receiver, switching means for selectively coupling one end of said impedance means to first and second sources of bias, reverse supervisory signalling control means at said receiver station for controlling the actuation of said switching means, and detector means coupled to said communication link means at said transmitter for discriminating between the quiescent levels of said first and second sources of bias.

2. The communication system defined in claim 1 wherein said communication link means comprises a coaxial cable and wherein said impedance means comprises resistive means substantially equivalent in value to the characteristic impedance of said coaxial cable and wherein said reverse supervisory control means includes circuit means responsive to a predetermined condition at said receiver station.

3. The communication system defined in claim 1 wherein said detector means comprises voltage level responsive circuit means for recognizing the voltage level of one of said first and second sources of bias as a reverse supervisory control signal.

4. In a facsimile system including a transmitter station for converting information on a document to be transmitted into electrical video signals indicative of the marked and unmarked portions of a document along a predetermined scanning raster and additionally including a receiver station for marking a record to generate a facsimile of the document in response to received video and control signals the improved communication system comprising direct current path means for coupling said transmitter station to said receiver station, a source of signalling bias, reverse supervisory signalling control means at said receiver station for selectively coupling said source of reverse signal bias to said direct current path means through a high impedance and reverse supervisory signal detection means at said transmitter station for recognizing the level of said reverse signal bias source.

5. The communication system defined in claim 4 additionally including transmission control means responsive to said reverse supervisory signal detection means for controlling the operation of at least predetermined modes of transmission of said transmitter station.

References Cited

UNITED STATES PATENTS

| | | | |
|---|---|---|---|
| 2,829,196 | 4/1958 | Claffey | 178—6 X |
| 2,978,676 | 4/1961 | Spencer | 340—154 |
| 3,278,677 | 10/1966 | Fannoy | 178—6 |
| 3,281,695 | 10/1966 | Bass | 325—31 |
| 3,281,791 | 10/1966 | Riches | 340—172 |
| 3,369,079 | 2/1968 | Glidden | 179—5 |

ROBERT L. GRIFFIN, *Primary Examiner.*

RICHARD K. ECKERT, Jr., *Assistant Examiner.*

U.S. Cl. X.R.

179—.4